(12) United States Patent
Argoitia et al.

(10) Patent No.: US 7,258,915 B2
(45) Date of Patent: Aug. 21, 2007

(54) FLAKE FOR COVERT SECURITY APPLICATIONS

(75) Inventors: Alberto Argoitia, Santa Rosa, CA (US); Paul G. Coombs, Santa Rosa, CA (US); Charles T. Markantes, Santa Rosa, CA (US); Paul T. Kohlmann, Windsor, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 415 days.

(21) Appl. No.: 10/641,695

(22) Filed: Aug. 14, 2003

(65) Prior Publication Data

US 2005/0037192 A1    Feb. 17, 2005

(51) Int. Cl.
*B32B 5/16* (2006.01)

(52) U.S. Cl. .................. 428/323; 428/328; 428/403; 428/407

(58) Field of Classification Search ............... 428/323, 428/328, 403, 407
See application file for complete search history.

(56) References Cited

U.S. PATENT DOCUMENTS

| | | | |
|---|---|---|---|
| 2,570,856 A | 10/1951 | Pratt et al. ...................... 41/32 |
| 3,123,490 A | 3/1964 | Bolomey et al. ............ 106/291 |
| 3,610,721 A | 10/1971 | Abramson et al. ............ 350/3.5 |
| 3,627,580 A | 12/1971 | Krall ............................ 117/238 |
| 3,633,720 A | 1/1972 | Tyler ............................ 400/105 |
| 3,676,273 A | 7/1972 | Graves ............................. 161/3 |
| 3,790,407 A | 2/1974 | Merten et al. ................ 428/148 |
| 3,791,864 A | 2/1974 | Steingroever ................ 117/238 |
| 3,845,499 A | 10/1974 | Ballinger ..................... 346/74.3 |
| 3,853,676 A | 12/1974 | Graves ............................ 161/5 |
| 3,873,975 A | 3/1975 | Miklos et al. ................. 360/25 |
| 4,011,009 A | 3/1977 | Lama et al. .................. 359/571 |
| 4,054,922 A | 10/1977 | Fichter ....................... 346/74.3 |
| 4,099,838 A | 7/1978 | Cook et al. .................. 359/537 |
| 4,197,563 A | 4/1980 | Michaud .................... 346/74.3 |
| 4,271,782 A | 6/1981 | Bate et al. ................... 118/623 |
| 4,398,798 A | 8/1983 | Krawczak et al. ........... 359/573 |
| 4,543,551 A | 9/1985 | Petersen ...................... 335/284 |
| 4,788,116 A | 11/1988 | Hochberg .................... 430/21 |
| 4,867,793 A | 9/1989 | Franz et al. ................. 106/415 |
| 4,931,309 A | 6/1990 | Komatsu et al. ............. 427/599 |
| 5,079,058 A | 1/1992 | Tomiyama .................... 428/40 |
| 5,079,085 A | 1/1992 | Hashimoto et al. ......... 428/327 |
| 5,177,344 A | 1/1993 | Pease ........................... 235/449 |
| 5,192,611 A | 3/1993 | Tomiyama et al. .......... 428/354 |
| 5,223,360 A | 6/1993 | Prengel et al. .............. 430/39 |
| 5,364,689 A | 11/1994 | Kashiwagi et al. .......... 428/195 |
| 5,368,898 A | 11/1994 | Akedo ......................... 427/510 |
| 5,424,119 A | 6/1995 | Phillips et al. ............... 428/328 |
| 5,474,814 A | 12/1995 | Komatsu et al. ............. 427/549 |
| 5,613,022 A | 3/1997 | Odhner et al. ............... 385/37 |
| 5,624,076 A | 4/1997 | Miekka et al. ................ 241/3 |
| 5,627,663 A | 5/1997 | Horan et al. .................... 359/2 |
| 5,630,877 A | 5/1997 | Kashiwagi et al. ......... 118/623 |
| 5,672,410 A | 9/1997 | Miekka et al. .............. 428/148 |
| 5,811,775 A | 9/1998 | Lee ............................. 235/457 |
| 5,991,078 A | 11/1999 | Yoshitake et al. .......... 359/567 |
| 6,033,782 A | 3/2000 | Hubbard et al. ............ 428/407 |
| 6,043,936 A | 3/2000 | Large ......................... 359/572 |
| 6,068,691 A | 5/2000 | Miekka et al. .............. 106/403 |
| 6,103,361 A | 8/2000 | Batzar et al. ............... 428/323 |
| 6,168,100 B1 | 1/2001 | Kato et al. ...................... 241/1 |
| 6,403,169 B1 | 6/2002 | Hardwick et al. .......... 427/548 |

(Continued)

FOREIGN PATENT DOCUMENTS

DE    4212290    5/1993

(Continued)

OTHER PUBLICATIONS

Dobrowolski et al., "Research on Thin Film Anticounterfeiting Coatings at the National Research Council of Canada", Applied Optics, vol. 28, No. 14, pp. 2702-17 (Jul. 15, 1989).

(Continued)

*Primary Examiner*—Leszek Kiliman
(74) *Attorney, Agent, or Firm*—Allen, Dyer, Doppelt, Milbrath & Gilchrist, P.A.

(57) ABSTRACT

Covert flakes having one or more symbols and/or a selected shape are used in a composition, such as ink or paint, to provide a covert security feature to an object. In some embodiments the composition includes base pigment, and the covert flakes are covert pigment flakes that match the visual characteristics of the base pigment. In another embodiment, clear covert flakes are mixed in the carrier with base pigment. In another embodiment, clear covert flakes are mixed in a varnish base to provide a clear composition that can be applied over an existing security feature or elsewhere. The composition is used to print a field on the object, such as a stock certificate or bank note, for example. The covert flakes are not readily detectable by causal observation under visible light. In one embodiment, illuminating the covert security feature with ultraviolet light causes a covert flake to fluoresce and allows the observer to identify the location of the covert flake so that cover indicia may be observed. In a particular embodiment, a covert flake having one or more symbols is located using non-visible radiation, and then observed under visible light to read the symbol(s) on the covert flake.

30 Claims, 3 Drawing Sheets

U.S. PATENT DOCUMENTS

| | | | |
|---|---|---|---|
| 6,549,131 B1 | 4/2003 | Cote et al. | 340/572.1 |
| 6,589,331 B2 | 7/2003 | Ostertag et al. | 106/460 |
| 6,643,001 B1 | 11/2003 | Faris | 356/37 |
| 6,649,256 B1 | 11/2003 | Buczek et al. | 428/323 |
| 6,692,830 B2 | 2/2004 | Argoitia et al. | 428/403 |
| 6,749,777 B2 | 6/2004 | Argoitia et al. | 252/582 |
| 6,749,936 B2 | 6/2004 | Argoitia et al. | 428/402 |
| 6,759,097 B2 | 7/2004 | Phillips et al. | 427/510 |
| 6,808,806 B2 | 10/2004 | Phillips et al. | 428/403 |
| 6,815,065 B2 | 11/2004 | Argoitia et al. | 428/403 |
| 6,841,238 B2 | 1/2005 | Argoitia et al. | 428/323 |
| 6,902,807 B1 | 6/2005 | Argoitia et al. | 428/403 |
| 6,987,590 B2 | 1/2006 | Phillips et al. | 359/2 |
| 7,047,883 B2 | 5/2006 | Raksha et al. | 101/489 |
| 2002/0021003 A1 | 2/2002 | McGrew | 283/93 |
| 2004/0009309 A1 | 1/2004 | Raksha et al. | 427/598 |
| 2004/0105963 A1 | 6/2004 | Bonkowski et al. | 428/195.1 |
| 2004/0151827 A1 | 8/2004 | Argoitia et al. | 427/7 |
| 2005/0106367 A1 | 5/2005 | Raksha et al. | 428/199 |
| 2005/0123755 A1 | 6/2005 | Argoitial et al. | 428/402 |
| 2006/0035080 A1 | 2/2006 | Argoitia | 428/402 |

FOREIGN PATENT DOCUMENTS

| | | |
|---|---|---|
| EP | 0341002 | 11/1989 |
| EP | 0556449 | 8/1993 |
| EP | 0406667 | 1/1995 |
| EP | 0710508 | 5/1996 |
| EP | 0953937 | 11/1999 |
| EP | 0 978 373 A2 | 2/2000 |
| EP | 1239307 | 9/2002 |
| EP | 1 353 197 | 10/2003 |
| EP | 1 498 545 A | 1/2005 |
| GB | 1107395 | 3/1968 |
| GB | 1131038 | 10/1968 |
| JP | 63172779 | 7/1988 |
| WO | WO88/07214 | 9/1988 |
| WO | WO95/13569 | 5/1995 |
| WO | WO 00/08596 | 2/2000 |
| WO | WO 01/03945 A1 | 1/2001 |
| WO | WO 01/53113 A | 7/2001 |
| WO | WO 02/40599 A1 | 5/2002 |
| WO | WO02/40600 | 5/2002 |
| WO | WO 02/053677 A1 | 7/2002 |
| WO | WO02/090002 | 11/2002 |
| WO | 03/102084 * | 5/2003 |
| WO | WO 03/102084 | 12/2003 |
| WO | 2004024836 | 3/2004 |
| WO | WO05/017048 | 2/2005 |

OTHER PUBLICATIONS

Powell et al, (ED.), Vapor Deposition, John Wiley & Sons, p. 132 (1996).

Van Renesse (Ed.), Optical Document Security, 2$^{nd}$ Ed., Artech House, 254, 349-69 (1997).

Prokes et al (Ed.), Novel Methods of Nanoscale Wire Formation, Mat. Research Soc. Bul., pp. 13-14 (Aug. 1999).

Lotz et al., Optical Layers on Large Area Plastic Films, Precision, Applied Films (Nov. 2001).

Halliday et al, "Fundamentals of Physics, Sixth Edition", p. 662, Jul. 2000.

Argoitia et al, "Pigments Exhibiting Diffractive Effects", Soc. of Vac. Coaters, 45$^{th}$ Annual Tech. Conf. Proceed. (2002).

Argoitia et al, "The concept of printable holograms through the alignment of diffractive pigments", SPIE Conference on Document Security, Jan. 2004.

Llewellyn, "Dovids: Functional Beauty—discussion about holography", Paper, Film, and Foil Converter, Aug. 2002.

Hardin, "Optical tricks designed to foil counterfeiters" OE Reports, No. 191, Nov. 1999.

Himpsel et al, "Nanowires by Step Decoration", Mat. Research Soc. Bul., p. 20-24 (Aug. 1999).

Argoitia and Witzman, Pigments Exhibiting Diffractive Effects, Soc. Of Vac. Coaters, 45$^{th}$ Annual Tech. Conf. Proceed. (2002).

Coombs et al, "Integration of contracting technologies into advanced optical security devices", SPIE Conference on Document Security, Jan. 2004.

\* cited by examiner

FLAKE FOR COVERT SECURITY APPLICATIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to pigment flakes, and more particularly to a coating composition such as ink or paint that provides a covert security feature (e.g. anti-counterfeiting feature) to objects that the coating composition is applied to.

BACKGROUND OF THE INVENTION

Specialty pigments have been developed for use in security applications, such as anti-counterfeiting devices printed on banknotes, packaging of high-value items, seals for containers, and even for direct application to commercial items. For example, the U.S. twenty-dollar Federal Reserve Note currently uses optically variable ink. The number "20" printed in the lower-right corner of the face of the note changes color as the viewing angle changes. This is an overt anti-counterfeiting device. The color-shifting effect is not reproducible by ordinary color photocopiers, and someone receiving a note can observe whether it has the color-shifting security feature to determine the note's authenticity.

Other high-value documents and objects use similar measures. For example, iridescent pigments or diffractive pigments are used in paints and inks that are applied directly to an article, such as a stock certificate, passport, original product packaging, or to seals that are applied to an article. Unfortunately, counterfeiters continue to become more sophisticated. Security features that are more difficult to counterfeit are desirable.

One anti-counterfeiting approach uses microscopic symbols on multi-layer color-shifting pigment flakes. The symbols are formed on at least one of the layers of the multi-layer color-shifting pigment flakes by a local change of an optical property(s), such as reflectivity. The multi-layer color-shifting pigment flakes generally include a Fabry Perot-type structure having an absorbing layer separated from a reflective layer by a spacer layer. The reflective layer is typically a layer of metal, which renders the pigment flake essentially opaque. If a large portion of these types of pigment flakes are mixed with other pigment, the resultant color might be significantly different from the pigment.

Clear pigment flakes with holographic information are also used for anti-counterfeiting purposes. A monochromatic volume hologram is formed in a polymeric platelet using a reference laser light in the visible, infrared ("IR"), or ultraviolet ("UV") region. The polymeric platelet does not have a metallic reflective layer, and may be mixed in with other coatings, including metallic coatings (e.g. inks and paints), without disturbing the subjective color appearance of the coating. The polymeric platelets can also be incorporated in a varnish coating, which may be applied over an article without changing its color. When the polymeric platelets are irradiated with the reference laser light, the hologram may be read for the information it contains. However, polymeric materials may break down in sunlight and holograms have become relatively easy to counterfeit because an original hologram can provide a "fingerprint" (template) that facilitates copying. Holograms are not as strong an anti-counterfeiting device as they used to be.

It is desirable to mark objects with covert anti-counterfeiting devices that overcome the limitations of the techniques discussed above.

BRIEF SUMMARY OF THE INVENTION

A coating composition includes covert flakes with identifying indicia made of a single layer of inorganic dielectric material. Examples of identifying indicia includes selected flake shape(s) and/or symbol(s). The covert flakes are typically dispersed in a carrier, such as a varnish base, paint vehicle or ink vehicle, to form a coating composition. The covert flakes are dispersed in sufficiently dilute concentration so that the covert flakes are not easily detectable in the coating composition by casual observation and can be clear or colored to match the color of a base pigment.

In a particular embodiment, covert security flakes fluoresce when illuminated with non-visible radiation. In an embodiment of the invention, fluorescing covert security flakes make up less than 1% of the composition.

In another embodiment, clear covert flakes in a varnish composition make up to 20% of the composition. In another embodiment, clear covert flakes make up to 10 weight percent of a total pigment weight in a composition having optically variable base pigment flakes.

In a particular embodiment the covert flakes are a single layer of an inorganic dielectric material, such as ZnS. The thickness of the single layer of inorganic dielectric material is selected to provide a covert flake that has color, or that is clear. In a further embodiment, clear covert flake is heat-treated to improve its clarity (i.e. "whiteness").

In another embodiment, a coating composition has clear covert flakes that are not easily detectable in the coating composition by observation under visible light dispersed in a carrier. The clear covert pigment flakes fluoresce when illuminated with UV light and have one or more symbols readable under visible light at a magnification of 50×-200×. In a particular embodiment, the clear covert flakes in the carrier have a transmittance of more than 70% in the visible region.

A composition according to an embodiment of the present invention is applied to an object to provide a covert security feature. A pigmented composition may be used to print a field (e.g. an image) on the object, and a varnish composition may be used to print a clear field on the object, or to overprint an existing image on the object. In an embodiment of the invention, covert flake is mixed with base pigment to provide a covert security feature to images printed with the composition that look substantially similar to images printed with the base pigment.

In a method according to an embodiment of the present invention, symbols on covert flakes are not readable when the covert security feature is illuminated with non-visible radiation, i.e. when the flake is fluorescing. The location of a covert flake is identified using non-visible radiation, and then the flake is observed under visible light (typically under magnification of 50×-200×) to read the symbol(s) on the covert flake.

DETAILED DESCRIPTION OF THE INVENTION

I. Introduction

Flakes for covert security applications are not typically seen by casual observation. Some sort of inspection technique, such as inspection under a microscope or illumination with a particular type of light, is used to find and/or read the flakes. Flakes according to embodiments of the invention can be colored ("pigment flakes") or essentially clear.

In one embodiment, flakes containing indicia, such as a symbol or a particular shape, substantially match the visual characteristics of a bulk pigment or other substance they are mixed with. In a particular embodiment, a single-layer inorganic flake having a selected shape or symbol is mixed with an iridescent mica-based flake or other base pigment. In another embodiment, clear flakes having indicia are mixed with bulk pigment without disturbing the visual characteristic of the resultant mixture. In yet another embodiment, clear flakes having indicia are mixed in a varnish and applied over an object to provide a covert security feature without substantially changing the underlying color. As used herein, a varnish is generally a substantially clear composition.

In a particular embodiment, flakes made from a single-layer of ZnS are heat-treated to whiten or "bleach" the appearance of the flake and improving the clarity (i.e. reducing the yellow nature) of the resultant composition. For the purpose of this discussion, a "single layer" of inorganic material includes multiple layers of the same inorganic material built up upon each other.

In yet another embodiment, covert flakes are mixed with a chemical, such as an explosive, explosive precursor, food, drug, or controlled substance. The covert flakes include indicia, such as symbols and/or other patterning (e.g. grooves) that identify the manufacturer or provide other specific information. Inorganic flakes are particularly desirable in applications where heat, solvents, sunlight, or other factors may degrade organic flakes. For example, an inorganic covert flake used in an explosive is detectable even after exposure to high temperatures and/or pressures, and is persistent in the environment.

II. Exemplary Covert Flake

Figure 1:
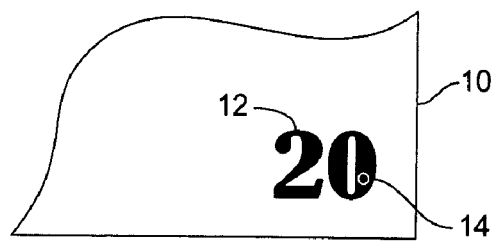
FIG. 1 is a plan view of a portion of a document with a security feature according to an embodiment of the present invention.

FIG. 1 is a plan view of a portion of a document 10 with a security feature 12 according to an embodiment of the present invention. At least a portion 14 of the security feature 12 is printed with ink or paint including clear or colored flakes having indicia (hereinafter "covert flakes") mixed with bulk pigment, such as bulk pigment flakes. In one embodiment, the covert flakes have a particular shape, such as being square, rectangular, trapezoidal, "diamond" shaped, or round, for example. In another embodiment, the covert flakes include a symbol and/or grating pattern, with or without having a selected shape. Covert flakes are also sometimes referred to as "taggent" flakes, although not all taggent flakes are necessarily covert flakes.

Generally, the bulk pigment particles have an irregular shape. In one embodiment, the covert flakes are distinguishable from bulk pigment particles, including bulk pigment flakes, by their shape. Alternatively, bulk pigment flakes have a first selected shape, and the covert flakes have a second selected shape. Production of shaped pigment flakes is accomplished by a variety of techniques, such as using a patterned substrate to deposit the flake material on the substrate and then separating the flake from the substrate to obtain the pattern, or using a laser or other means to cut the patterned flakes from a sheet of flake material. The selected shape of the covert flakes may be associated with a manufacturing facility, date of manufacture, or other aspect of the document 10, or ink used in producing the document, for example.

A roll coater is one type of apparatus that can be used to produce covert flakes according to embodiments of the invention. A roll of a sheet of polymer substrate material (also known as a "web") is passed through a deposition zone(s) and coated with one or more thin film layers. Multiple passes of the roll of polymer substrate back and forth through the deposition zone(s) may be made. The thin film layer(s) is then separated from the polymer substrate and processed into flake. Other apparatus and techniques may be used.

Alternatively or in addition to having a selected shape, the covert flakes may include one or more symbols. The symbol could be a letter, number, or other marking. A symbol could indicate the manufacturer of the covert flake, the user of the covert flake, or a date code, for example. The symbol(s) could be embossed on a substrate used in a roll coater prior to depositing thin film layers that are processed into flakes, or formed on the thin film layers after deposition, such as by laser ablation, embossing, or etching, for example.

A pigment flake with a selected shape or symbol provides a security feature even if it is easily observable; however, if a pigment flake with a selected shape or symbol is not easily observable, a counterfeiter might not even be aware that a covert flake is present. One embodiment of the present invention uses covert pigment flake that has the same optical characteristics as the base pigment. The percentage of covert pigment flakes is sufficiently small so that the covert pigment flakes are not easily found, even under microscopic examination. For example, if an ink composition has covert pigment flakes making up less than 1% of the total weight of pigment (i.e. base pigment plus covert pigment), the covert pigment flakes are difficult to find.

Another approach is to use a clear, inorganic covert flake with a selected shape or symbol. In one embodiment, clear inorganic covert flakes are mixed with base pigment flakes in a carrier, such as an ink vehicle or a paint vehicle, to form a composition, such as ink or paint. In another embodiment, the clear inorganic covert flakes are mixed in a clear carrier to form a varnish. The index of refraction of the carrier is sufficiently similar to the index of refraction of the clear covert flake so that the covert flake "disappears" in the carrier. Examples of carriers include polyvinyl alcohol, polyvinyl acetate polyvinylpyrrolidone, poly(ethoxyethylene), poly(methoxyethylene), poly(acrylic) acid, poly(acrylamide), poly(oxyethylene), poly(maleic anhydride), hydroxyethyl cellulose, cellulose acetate, poly(sacchrides) such as gum arabic and pectin, poly(acetals), such as polyvinylbutyral, poly(vinyl halides), such as polyvinyl chloride and polyvinylene chloride, poly(dienes) such as polybutadiene, poly(alkenes) such as polyethylene, poly(acrylates) such as polymethyl acrylate, poly(methacrylates) such as poly methylmethacrylate, poly(carbonates) such as poly (oxycarbonyl oxyhexamethylene, poly(esters) such as polyethylene terephthalate, poly(urethanes), poly(siloxanes), poly(suphides), poly(sulphones), poly(vinylnitriles), poly (acrylonitriles), poly(styrene), poly(phenylenes) such as poly(2,5 dihydroxy-1,4-phenyleneethylene), poly(amides), natural rubbers, formaldahyde resins and other polymers.

The clear covert flake does not typically become totally invisible in the carrier, but becomes less visible than it is in air. If an observer knows where to look, the clear flake typically has a shadowy appearance, as do symbols formed in or on the clear flake. However, if one does not know where or how to look for the clear flake, it usually goes undetected.

In a particular embodiment, the clear covert flake has a reflectivity in the visible range of about 30% in air, and less than 30% reflectivity in the carrier. Thus, the clear covert flake typically has a transmittance of more than 70% when dispersed in the carrier, which maintains the visible characteristics of the base pigment that the clear covert flake is mixed with or that underlies a varnish containing the clear covert flake.

Clear, inorganic covert flakes are difficult to detect, even when they make up more than 1% of the total pigment weight in a composition or varnish. In one embodiment, the clear covert flake is a single layer of ZnS heat-treated to fluoresce under UV light. The location of the ZnS covert flake is illuminated with UV light to identify its location, and then it is observed using visible light, typically under a microscope at about 20×-200×, to observe the indicia of the covert flake.

Figure 2A:
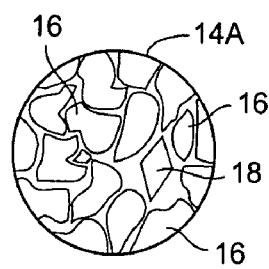
FIG. 2A is a simplified plan view of a portion of a security feature according to an embodiment of the present invention.

FIG. 2A is a simplified plan view of a portion 14A of a security feature according to an embodiment of the present invention. The portion 14A of the security feature is viewed under magnification, typically about 20×-200×, in order to see the shape of the flakes, which are typically about 5-100 microns across, more typically about 20-40 microns across. The security feature has been printed with ink including base pigment particles 16 and a covert pigment flake 18 having a selected shape, in this case a "diamond" shape. The base pigment particles are illustrated as being irregularly shaped flakes. Alternatively, the base pigment particles are flakes having a selected shape. The covert pigment flake has similar optical characteristics as the base pigment particles, otherwise does not disturb the visual appearance of a composition made with the base pigment particles.

When the covert pigment flake is illuminated with non-visible radiation, such as UV or IR light or an electron beam, the covert pigment flake glows. In a particular embodiment, the covert pigment flake fluoresces under UV light. Illuminating the covert pigment flake with non-visible radiation allows an observer to identify where the covert pigment flake is located in the security feature, even if present in very small quantities. The observer then inspects the covert pigment flake under visible light to see the selected shape of the covert pigment flake, or to see the symbol(s) on the covert flake.

Figure 2B:
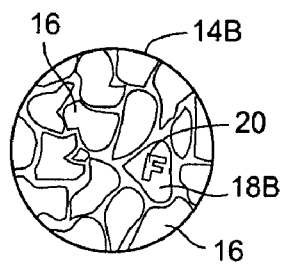
FIG. 2B is a simplified plan view of a portion of a security feature according to another embodiment of the present invention.

FIG. 2B is a simplified plan view of a portion of a security feature 14B according to another embodiment of the present invention. The security feature has been printed with ink including base pigment particles 16 and a covert pigment flake 18B having an irregular shape and containing a symbol 20, in this case a stylized "F". Several different symbols and combination of symbols could be used. The portion 14B of the security feature is viewed under magnification, typically about 100×-200×, in order to see the symbol(s), which are typically about 0.5-20 microns high, on the covert pigment flake 18B.

The covert pigment flake 18B was made by depositing one or more thin film layers on a substrate, such as a plastic film, separating the thin film layer(s) from the substrate, and processing the separated thin film layer(s), such as by milling and sieving, into the desired flakes. The covert pigment flakes are typically about 5-100 microns across, and more typically about 20-100 microns across. The symbol 20 is typically about 0.5-20 microns tall. In a particular embodiment, the symbol 20 is about 700 nanometers tall and in another embodiment the symbol is about 15 microns tall. It is generally desirable to have the symbols sufficiently close so that most flakes have at least an identifiable portion of a symbol. In one embodiment, symbols that were 8 microns tall were spaced about 2 microns apart, which resulted in covert flakes having about 6 symbols per flake, on average. Symbols having bilateral symmetry appear the same whether viewed from the top or the bottom of a clear flake, but such symmetry is not required. In another embodiment, symbols that were about 15 microns tall were spaced about 4 microns apart.

The symbols are typically embossed on the substrate, and the thin film layer(s) deposited over the embossed substrate. The surface of the substrate, namely the symbol, is replicated in at least the first thin film layer that is deposited on the substrate, in either positive or negative relief. Thus, when the thin film layer(s) is separated from the embossed substrate and processed into flake, at least some of the flakes contain the symbol. The spacing of embossed symbols on the flake can be selected so that essentially every flake above a certain size will contain at least one symbol.

The base pigment particles are illustrated as being irregularly shaped flakes. Alternatively, the base pigment particles have a selected shape. Similarly, the covert pigment flake 18B could have a selected shape, in addition to the symbol 20, and a superimposed grating, such as a diffraction grating, could be included either over the entire flake or over selected portions of the flake, such as over the field of the flake, but not over the symbol. Alternatively, one type of grating is formed in the field of the flake, and another type of grating (e.g. with different pitch) is formed in the symbol area. The addition of a grating further increases the difficulty of counterfeiting. The covert pigment flake has generally the same optical characteristics as the base pigment particles, or is present in sufficiently small quantities so as not to disturb the visual appearance of a composition made with the base pigment particles.

In a particular embodiment, the base pigment particles are flakes of mica coated with a layer of $TiO_2$ or other dielectric material. The coating material typically has a relatively high index of refraction. Mica is a naturally occurring mineral that is relatively inexpensive and easily processed into flake substrate. When mica flake substrate is coated with a layer of high-index material of a selected thickness, a nacreous pigment flake is obtained. Mica flake substrate can be coated with several alternative materials using a variety of processes. Such pigments are commonly known as "mica-based" pigments. A photocopy of an image printed with such nacreous pigment flakes does not look like the original, thus mica-based pigment flakes are desirable for use to provide overt security features. However, shaping mica flake substrate or providing a symbol on mica flake substrate is impractical. Covert pigment flake according to an embodiment of the present invention is mixed with the mica-based pigment to enable a covert security feature to be included in images printed with mica-based pigment flakes. Covert pigment flakes made of a single layer of inorganic dielectric material, such as $TiO_2$ or ZnS, can have an appearance similar to a mica-based pigment if the covert pigment flake has a thickness about five times the quarter-wave optical thickness ("QWOT") at a selected wavelength in the visible spectrum. Typically, a single-layer covert pigment flake of ZnS intended to match the appearance of a mica-based pigment has a thickness of about 60 nm to about 600 nm.

Figure 2C:
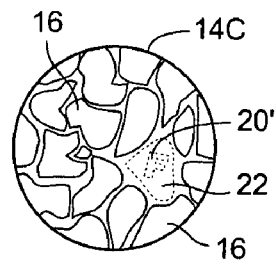
FIG. 2C is a simplified plan view of a portion of a security feature according to yet another embodiment of the present invention.

FIG. 2C is a simplified plan view of a portion of a security feature 14C according to yet another embodiment of the present invention. The security feature has been printed with ink including base pigment particles 16 and a clear covert flake 22 having an irregular shape and containing a symbol 20', in this case a stylized "F". Several different symbols and combination of symbols are alternatively used. Alternatively, a clear covert flake has a selected shape, with or without a symbol.

The clear covert flake is formed from a deposited (i.e. synthetic), inorganic thin film layer and in a particular embodiment is a single layer of ZnS about 700 nm thick. In a further embodiment, the ZnS flake it treated to enhance fluorescence. Alternatively, other materials that fluoresce visible light when exposed to UV light are used in other embodiments, such as zinc silicate, calcium-tungsten oxide, yttrium phosphate vanadium, doped yttrium oxide (such as with europium), and alkaline earth aluminates doped with rare earth aluminates, to name a few. Alternatively, other materials that fluoresce in the long UV range (300-400 nm) when excited with low UV radiation (about 250 nm) are used. Fluorescence is not required for all embodiments of the present invention.

In one embodiment, the material of the clear covert flake is chosen according to the intended carrier that it will be mixed with to obtain a selected match or mismatch of the index of refraction of the flake in the carrier. For example, when a clear flake made from a low-index material is mixed in a low-index carrier, the clear flake is very difficult to see. If the low-index clear flake is mixed in a high-index carrier, the clear flake is easier to see, but still not generally detected by casual observation.

Single layer flakes made of inorganic materials more than about ten QWOTs thick tend to be clear, rather than tinted or nacreous. However, even clear flakes can impart a yellowish tinge to a composition, such as a varnish. It was discovered that heat-treating some clear inorganic flakes improved their "whiteness", resulting in a superior varnish for use in covert security applications. In a particular embodiment, clear pigment flakes made from a single layer of ZnS about 700 nm thick were heated in air to a temperature of 550° C. for about 600 minutes to enhance fluorescence under UV light. This heat treatment also improved the whiteness of the ZnS flake.

It is thought that trace elements remaining from the roll-coating process contributed to the enhanced fluorescence. In particular, NaCl was used as a release layer on the polymer substrate used in the roll coating process. A single layer of ZnS was deposited over the NaCl release layer, which was subsequently dissolved in water to facilitate removal of the ZnS from the polymer substrate. It is thought that sodium from the release layer doped the ZnS or activated other dopants, resulting in enhanced fluorescence.

Figure 3:
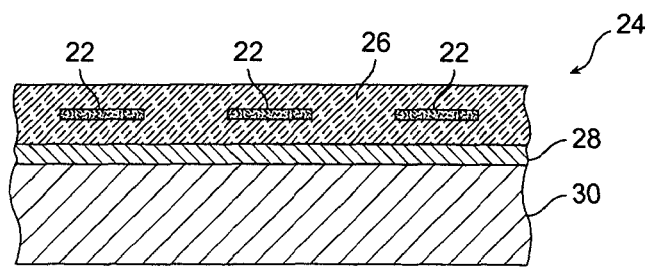
FIG. 3 is a cross section of a varnish with clear covert flakes dispersed in a carrier according to an embodiment of the present invention.

FIG. 3 is a cross section of a varnish 24 with clear covert flakes 22 dispersed in a carrier 26 according to an embodiment of the present invention. An optional color coat 28 has been applied to an object 30 underneath the varnish 24. The varnish 24 provides a covert security feature to the object without disturbing its appearance. In a particular embodiment, the optional color coat 28 is an image printed with nacreous or color-shifting pigment to provide an overt security feature to the object. The object is a document, product, packaging, or seal, for example. The varnish 24 enables providing a covert security feature to an object that already has a covert security feature without significantly altering the appearance of the object. For example, if stock certificates have been printed with overt security features and it subsequently becomes desirable to provide a covert security feature to the stock certificates, the overt security feature is over-printed with the varnish or a similar clear ink composition. In another embodiment, an additional covert security feature is provided to an object already having one or more covert security features. In a particular embodiment, the clear covert flakes make up not more than 2% of the varnish. Additional discussion regarding varnishes is provided below in the section on experimental results.

Figure 4:
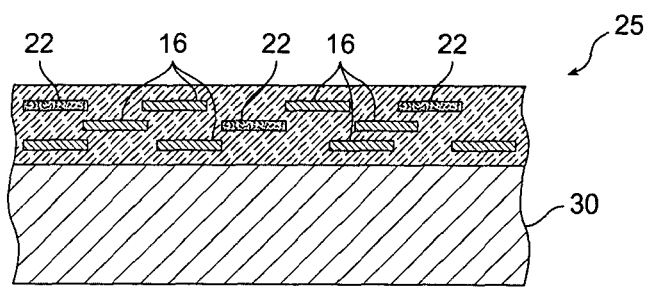
FIG. 4 is a cross section of base flakes and covert flakes dispersed in a binder according to another embodiment of the present invention.

FIG. 4 is a cross section of a composition 25 (e.g. ink or paint) including base pigment flakes 16 and clear covert flakes 22 dispersed in a binder according to another embodiment of the present invention. The clear covert flakes 22 have a symbol (see FIG. 2C, ref. num. 20'). Alternatively, the composition 25 includes selectively shaped clear flake, with or without a symbol(s), and/or covert pigment flake that is shaped and/or includes a symbol (see FIG. 2A, ref. num. 18 and FIG. 2B, ref. nums. 18B, 20). In one embodiment, the amount of clear covert flake 22 in the composition is less than 1% of the total weight of the base pigment flake 16 and clear covert flake 22 ("total pigment weight"), which sufficiently disperses the clear covert flakes in the base pigment flake to make casual detection of the covert flake difficult. In an alternative embodiment, the amount of clear covert flake in the composition is greater than 1%.

Adding covert flake to an existing ink or paint composition provides a covert security feature to images made of the ink or paint. For example, ink with color-shifting pigment is used to provide a color-shifting image as an overt security feature on a bank note or other object. Covert flake according to an embodiment of the present invention is added to the ink, and the resultant mixture is used to print images that appear substantially similar as those printed with the ink. Thus, a casual observer of the bank note does not notice a change in the appearance of the overt security feature (i.e. color-shifting image) after the covert security feature is added. The indicia of the covert flake indicates a date-of-manufacture, a printing location, and/or the source (manufacturer) of the ink, for example.

III. Identification of Covert Flakes

Figure 5A:
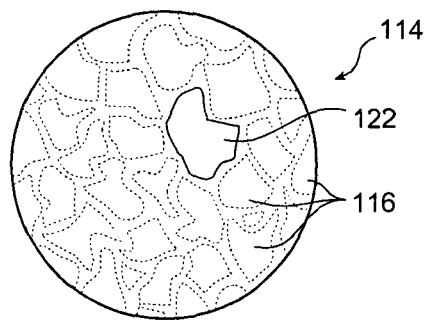
FIG. 5A is a simplified plan view of a portion of a security feature printed with clear, inorganic covert flake according to an embodiment of the present invention as seen under a microscope using UV illumination.

FIG. 5A is a simplified plan view of a portion of a security feature 114 printed with clear, inorganic covert flake 122 according to an embodiment of the present invention as seen under a microscope using UV illumination. The flakes are shown in a single layer for simplicity of illustration (compare FIG. 4). The clear covert flake 122 fluoresces (appears bright) and is easily distinguished from the base pigment flake 116, which appear dark and are shown in dashed lines for purposes of illustration. Typically, a much larger field of view is observed (i.e. lower magnification, typically 20×-50×). A reduced field of view is being shown for simplicity of illustration. Once the location of the fluorescent covert flake is identified, the viewer can "zoom-in" on the covert flake.

Figure 5B:
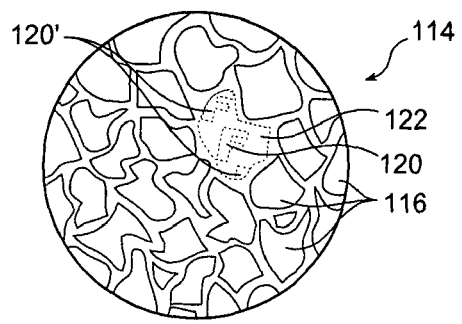
FIG. 5B is a simplified plan view of the portion of the security feature of FIG. 5A as seen under a microscope using visible light for illumination.

FIG. 5B is a simplified plan view of the portion of the security feature 114 of FIG. 5A as seen under a microscope using visible light for illumination. It was discovered that symbols on the clear covert flake were not easy to read under UV light because the fluorescence was a bulk phenomenon and obscured the symbol. When the UV light was switched off and the clear covert flake 122 was observed under a microscope using visible light, the faint outline of a symbol 120 (as well as the flake) was observable. Fluorescent covert flakes are particularly desirable when the concentration of flakes is low. The clear covert flake 122 and the symbol 120 are shown as dashed lines in this view to represent that they appear as faint outlines under visible light. The base pigment flakes 116 are shown as solid lines because they are typically prominent under visible light. In a particular embodiment, the clear covert flake was ZnS having an index of refraction of about 2.2 in a high-gloss varnish that was first observed under UV light, and then the symbol on the flake was read using visible light at a magnification of 100×.

A similar result is expected for covert pigment flakes that fluoresce under UV light or other non-visible radiation. For example, covert pigment flake dispersed in base pigment flake having similar visual characteristics is difficult to detect when the covert pigment flake is sufficiently dilute. In one embodiment, the covert pigment flake has a selected shape that is observable under UV light. In another embodiment, the covert pigment flake has a symbol that is not easily observable under UV light, but is observable under visible light. The location of the covert pigment flake with the symbol is identified using UV light and then the UV light is switched off and the symbol is read using visible light.

Alternatively, a material that fluoresces at a shorter wavelength when illuminated with light at a longer wavelength is used to fabricate covert flakes or covert pigment flakes. It is believed that this type of fluorescence would be less easily noticed by a counterfeiter, enhancing it use in covert security applications. In one embodiment, near infrared or infrared light is used to illuminate covert flake or covert pigment flake to fluoresce in the visible range.

IV. Experimental Results

Prior to developing clear covert flake or single-layer covert pigment, various alternatives were evaluated. A test standard using 100% magenta-to-green optically variable intaglio ("OVI") pigment flake was produced and measured. All taggent samples had a grating pattern of 2000 lines/mm, which makes the taggent flakes easier to distinguish from the base flake (i.e. locate) and more difficult to counterfeit. The grating pattern did not induce diffractive properties to images printed with the test compositions. It is believed that the low portion of the taggent flakes in combination with not being well oriented to the viewer avoided a diffractive property from occurring. In a particular embodiment of the present invention, a grating pattern was included on taggent flakes with symbols. The symbols were identifiable under a microscope at a first magnification, but the grating pattern was not easily seen at this first magnification. The grating pattern was seen at a higher magnification. It is believed that including such a grating pattern further enhances the covert nature of the taggent flake because a counterfeiter might see the symbol under microscopic examination, but not see the grating pattern, and hence not include it in a counterfeit article.

The first test sample ("sample 1") contained 90% (by weight) of the conventional magenta-to-green pigment flake mixed with 10% magenta-to-green OVI pigment flake including symbols ("taggent flake"). The taggent flakes were easy to detect by routine microscopic inspection, and the color performance of the mixture was the same as the test standard because the color of the taggent flake was well matched to the color of the base flake. However, close color matching involves careful monitoring of the production of the taggent flake. Similarly, a new optical design for each color of taggent flake would generally be used to match each color of base flake. Thus, this approach does not provide a generic taggent flake that can be mixed with a variety of colored base pigments.

A simpler approach is to use a standard taggent flake design that can be used with many different colors of base flake. Single-layer $MgF_2$ taggent flake (was mixed with the magenta-to-green OVI base pigment, the taggent flake making up 10% of the total pigment weight ("sample 2"). As with the color-matched OVI, color performance was essentially identical to samples produced with 100% base OVI pigment flake. However, the $MgF_2$ flakes were difficult to detect under routine microscopic examination, even at a concentration of 10%.

"Silver" (aluminum) taggent flake was also evaluated. Fabrication of silver flake is relatively simple and these flakes were very easy to detect at a concentration of 5%. It was hoped that silver taggent flakes would be able to be mixed with many colors of base pigment. However, the color performance of an intaglio blend containing only 5% silver taggent flake mixed with the magenta-to-green OVI base pigment ("sample 3") was poor. Thus, silver taggent flake may be useful in certain compositions, but appear to degrade the color performance of at least some base pigments.

Finally, clear taggent flake was made from a single layer of ZnS. Production of this flake is relatively easy, and detectability at 10% concentration was easy, which is to say it was more difficult than detecting the OVI taggent flakes, but much, much easier than detecting the $MgF_2$ taggent flakes. An intaglio blend with 10% ZnS flake and 90% magenta-to-green OVI flake ("sample 4") was compared against the test standard. The color performance was nearly equal, with a slight (about 3%) decrease in chroma. The persons involved in this subjective comparison are quite experienced in evaluating color performance of optically variable pigments, and used a side-by-side comparison against a standard. It is believed that 10% of this flake added to an existing ink or paint composition would preserve the color performance sufficiently so that an average observer would not notice any change. The ZnS clear taggent flake appears able to be added to a large number of colored pigments, including optically variable pigments without noticeably altering the appearance of compositions made with the colored pigments, and hence enables a generic taggent flake.

The measured optical performance of the samples described above is provided in Table 1:

TABLE 1

Optical Performance of Intaglio Blends

| Sample # | L* | a* | b* | C* | h |
|---|---|---|---|---|---|
| Test standard | 49.27 | 40.32 | −31.05 | 50.89 | 322.4 |
| Sample 1 | 49.08 | 40.25 | −30.87 | 50.73 | 322.51 |
| Sample 2 | 49.42 | 40.62 | −31.04 | 51.12 | 322.61 |
| Sample 3 | 52.67 | 35.26 | −27.26 | 44.57 | 322.29 |
| Sample 4 | 49.66 | 39.22 | −29.85 | 49.29 | 322.72 |

Clear ZnS flake for use as a taggent or covert taggent was also evaluated in varnish compositions. It was determined that in some instances almost one-third of the varnish composition could be clear flake with almost no change in the perceived appearance of the varnish composition. A high-gloss varnish base was used to make the varnish compositions and the varnish compositions were applied to white card stock of the type normally used for color evaluation of inks and paints. All varnish compositions were compared against a test standard of the varnish base without clear flake.

In the first varnish composition, 3% of as-deposited (i.e. not heat-treated for clarity) single-layer ZnS looked essentially identical to the test standard. A second varnish composition having 5% single-layer as-deposited ZnS flake was barely noticeably different when compared against the test standard, but it is believed that a casual observer would not notice the slight amount of yellowing. A third varnish sample with 10% single-layer as-deposited ZnS flake exhibited a noticeable change in appearance when compared against the test standard, and it is believed that some casual observers would notice a field printed with this composition on a very light background. However, this composition might be useful for printing on non-white substrates, such as bank notes or off-white stock certificates, where the slight yellowing would be less likely to be noticed. Alternatively, a non-gloss varnish base is used to further reduce likelihood of detection when used as a covert security feature. A fourth varnish sample with 15% single-layer as-deposited ZnS exhibited noticeable yellowing, even without a side-by-side comparison with the test standard.

Single-layer ZnS flake was heat treated to clarify ("bleach") the flake. The flake was heated to 200° C. for two hours in air. Heat treating ZnS flake to enhance fluorescence (550° C. for 10 hours in air) also bleaches the flake, but bleaching can be achieved with the shorter heat treat. A varnish composition using 20% single-layer bleached ZnS showed almost no perceptible color change. Thus, it is believed that at least 10% of unbleached single-layer ZnS flake and at least 20% of bleached single-layer ZnS flake could be added to a high-gloss varnish base as a covert taggent.

ZnS is further desirable as a taggent flake because, unlike some flake including a metal (e.g. aluminum) layer, ZnS is durable in the presence of water, acid, base, and bleach. Unlike some organic flake, ZnS is also durable in the presence of organic solvents and sunlight.

Figure 6:
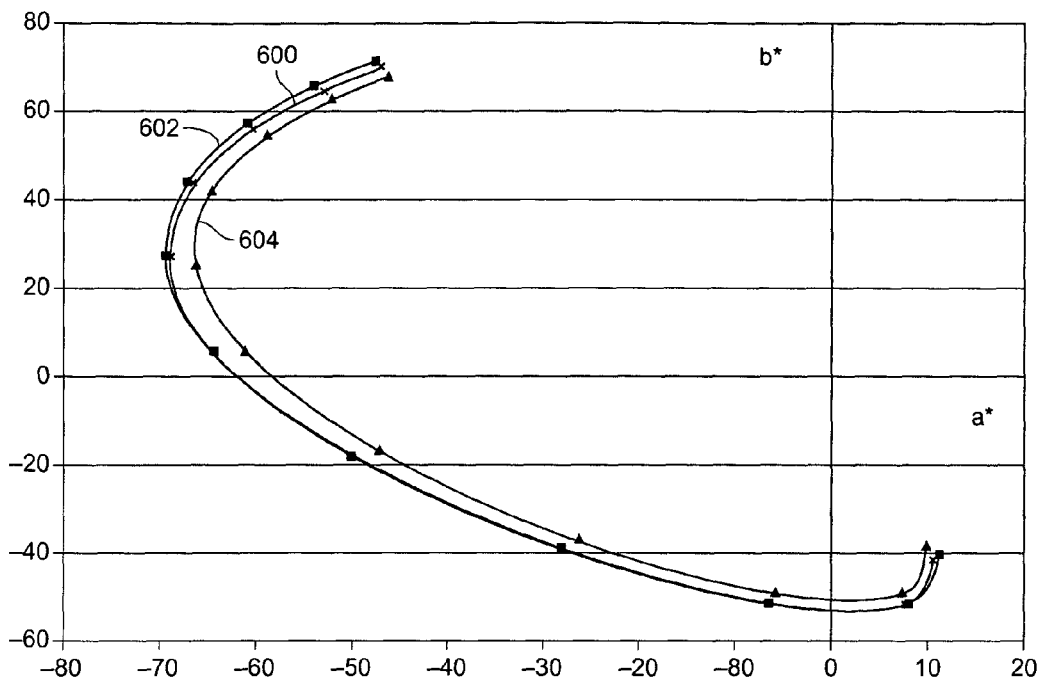
FIG. 6 shows the color travel for a test sample prepared with an ink, and for test samples prepared with the ink in combination with covert pigment flakes according to an embodiment of the present invention.

FIG. 6 shows the color travel for a test sample prepared with an ink, and for test samples prepared with the ink in combination with covert pigment flakes according to an embodiment of the present invention. The color plots are according to the CIE La*b* conventions. The illumination and viewing angles were ten degrees off from the specular angle to avoid the strong gloss component associated with clear-coated samples. The samples were characterized using eleven angles of illumination/viewing from 15°/5° to 65°/55° in 5° increments. The first point of the curve (i.e. the upper left point) corresponds to the 15°/5° datum, and the last (i.e. eleventh) point corresponds to the 65°/55° datum.

A first curve 600 shows the measured color travel for a test sample prepared with blue-to-green optically variable pigment flake. A second curve 602 shows the measured color travel for a sample prepared with 95 weight percent blue-to-green optically variable pigment flake and 5 weight percent of single-layer ZnS flake about 700 nm thick and having an average particle size of about 20 microns. Symbols on the flake were about 8×6 microns, separated by about 2 microns of field. The weight percent is the percent of the total weight of the flake used to prepare the ink composition for the sample. A third curve 604 shows the measured color travel for a sample prepared with 90 weight percent blue-green optically variable pigment flake and 10 weight percent of the same ZnS flake used in the sample associated with the second curve. These curves illustrate that very similar optical performance is achievable for ink compositions having up to 10 weight percent covert flake. In particular, the color travel is nearly identical for all three samples, and the chroma is only slightly less for the sample made with 10% clear covert flake. Thus, a covert flake according to an embodiment of the present invention is added to an existing optically variable ink to form a composition to provide a covert security feature without significantly altering the appearance of images printed with the composition.

V. Exemplary Methods

Figure 7:
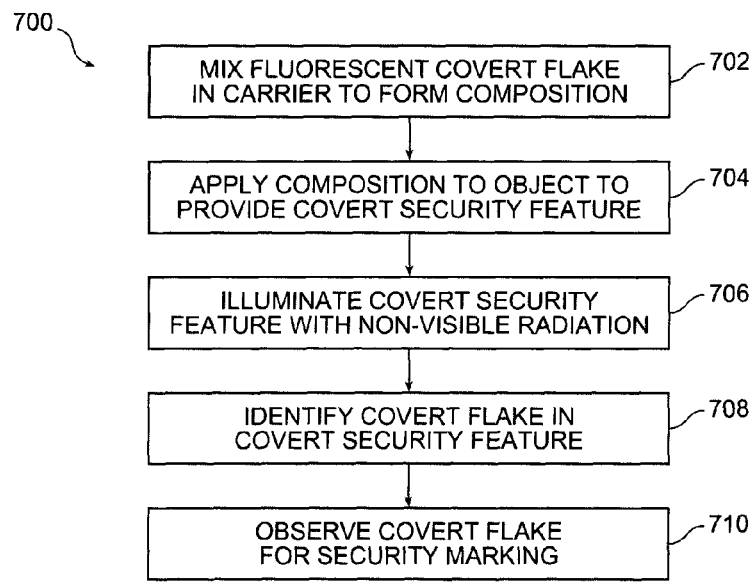
FIG. 7 is a simplified flow chart of a method of observing covert flakes according to an embodiment of the present invention.

FIG. 7 is a simplified flow chart of a method 700 of providing an object with covert flakes according to an embodiment of the present invention. Covert flakes that fluoresce under non-visible radiation are mixed in a carrier (step 702) to provide a composition, such as ink or paint, in which the covert flakes are not easily detectable by observation under visible light. In one embodiment, the covert flakes are clear covert flakes that have a symbol and/or a selected shape. In a further embodiment, the composition includes base pigment flakes or particles. In another embodiment, the covert flakes are covert pigment flakes that have a symbol and/or a selected shape. The composition is applied to the object (step 704) to provide a covert security feature. In one embodiment, the composition is applied using a printing step, such as a gravure, flexographic, offset, letterpress, intaglio, or screen printing step. In another embodiment, the composition is applied using a painting step, such as a rolling, dipping, brushing, or spray painting step.

After providing the covert security feature, the covert security feature is observed by illuminating the object with non-visible radiation (step 706) to cause the covert flakes to fluoresce and a covert flake is identified (step 708). If the composition has base pigment flakes or particles that also fluoresce, it is understood that the covert flakes fluoresce significantly more or less, or at a different color, than the base pigment flakes or particles so that the covert flakes stand out in the composition and are easily identified. The identified covert flake is observed (step 710) for a security marking. In one embodiment, the covert flake has a selected shape and is observed while the object is illuminated with non-visible radiation. In another embodiment, the covert flake includes a symbol, and the covert flake is observed using visible light after the step of identifying the covert flake using non-visible radiation. In a particular embodiment, the step of observing one or more symbols on the covert flake is done under magnification of 50×-200×.

While the invention has been described above in terms of various specific embodiments, the invention may be embodied in other specific forms without departing from the spirit of the invention. Thus, the embodiments described above illustrate the invention, but are not restrictive of the invention, which is indicated by the following claims. All modifications and equivalents that come within the meaning and range of the claims are included within their scope.

What is claimed is:

1. A coating composition comprising:
   a carrier; and
   a plurality of single-layer inorganic dielectric covert taggent flakes dispersed in the carrier.

2. The coating composition of claim 1 wherein the covert taggent flakes are clear covert flakes.

3. The coating composition of claim 2 wherein the clear covert flakes have a selected shape.

4. The coating composition of claim 2 wherein the clear covert flakes include a grating pattern.

5. The coating composition of claim 2 wherein the clear covert flakes include at least one selected readable symbol.

6. The coating composition of claim 5 wherein the clear covert flakes also have a grating pattern.

7. The coating composition of claim 2 wherein the carrier comprises a varnish base.

8. The coating composition of claim 2 wherein the clear covert flakes are ZnS flakes making up not more than 10% of the coating composition.

9. The coating composition of claim 2 wherein the clear covert flakes are heat treated ZnS flakes making up not more than 20% of the coating composition.

10. The coating composition of claim 2 further comprising base pigment dispersed in the carrier, an amount of the clear covert flakes in the coating composition being selected so that the coating composition appears to be the same color as a second coating composition consisting of the base pigment dispersed in the carrier.

11. The coating composition of claim 10 wherein the base pigment is optically variable pigment flake and the clear covert flakes are ZnS flakes, the ZnS flakes being not more than 10 weight percent of a total flake weight.

12. The coating composition of claim 10 wherein the clear covert flakes fluoresce when illuminated with non-visible radiation.

13. The coating composition of claim 12 wherein the base pigment fluoresces when illuminated with the non-visible radiation, the clear covert flakes fluorescing differently than the base pigment.

14. The coating composition of claim 2 wherein the clear covert flakes have a transmittance in the carrier of more than 70% in the visible region of light.

15. The coating composition of claim 1 further comprising base pigment having a color, wherein the covert flakes are covert pigment flakes having the color.

16. The coating composition of claim 15 wherein the covert pigment flakes have a selected shape.

17. The coating composition of claim 16 wherein the covert pigment flakes have a grating pattern.

18. The coating composition of claim 15 wherein the covert pigment flakes include at least one selected symbol.

19. The coating composition of claim 18 wherein the covert pigment flakes have a grating pattern.

20. The coating composition of claim 15 wherein the covert pigment flakes fluoresce when illuminated with non-visible radiation.

21. The coating composition of claim 20 wherein the base pigment fluoresces when illuminated with the non visible radiation, the covert pigment flakes fluorescing differently than the base pigment.

22. The coating composition of claim 15 wherein the covert pigment flakes are ZnS covert pigment flakes.

23. The coating composition of claim 22 wherein the base pigment comprises nacreous mineral-based flake and the ZnS covert pigment flakes have a thickness selected to match the nacreous mineral-based flake.

24. The coating composition of claim 15 wherein the covert pigment flakes fluoresce when illuminated with non-visible radiation.

25. The coating composition of claim 24 wherein the covert pigment flakes comprise less than 1 weight percent of a total pigment weight.

26. A coating composition comprising:
    a carrier; and
    clear covert flakes dispersed in the carrier, the clear covert flakes fluorescing when illuminated with ultraviolet light, the clear covert flakes having one or more symbols readable under visible light at a magnification of 50X-200.

27. A composition comprising:
    a chemical; and
    a plurality of inorganic dielectric taggent flakes having indicia, wherein the plurality of inorganic dielectric taggent flakes are mixed with the chemical to form the composition.

28. The composition of claim 27 wherein the chemical is an explosive compound or an explosive precursor.

29. The composition of claim 27 wherein the inorganic dielectric taggent flakes are essentially transparent and the indicia includes symbols.

30. The composition of claim 28 wherein the inorganic dielectric taggent flakes fluoresce when exposed to non-visible radiation.

* * * * *